United States Patent
Leung et al.

(10) Patent No.: US 10,401,027 B2
(45) Date of Patent: Sep. 3, 2019

(54) NON-RETURN VALVE FOR FLUE GAS VENTING AND DAMPER ASSEMBLY FOR USE THEREIN

(71) Applicant: IPEX TECHNOLOGIES INC., Oakville (CA)

(72) Inventors: Martin Kwan Yu Leung, Oakville (CA); Filippo Martino, Oakville (CA)

(73) Assignee: IPEX TECHNOLOGIES INC., Oakville (CA)

( * ) Notice: Subject to any disclaimer, the term of this patent is extended or adjusted under 35 U.S.C. 154(b) by 248 days.

(21) Appl. No.: 15/471,528

(22) Filed: Mar. 28, 2017

(65) Prior Publication Data
US 2018/0283685 A1   Oct. 4, 2018

(30) Foreign Application Priority Data
Mar. 30, 2016   (CA) .................................... 2925561

(51) Int. Cl.
*F23L 11/00*   (2006.01)
*F24H 8/00*    (2006.01)
*F23L 13/00*   (2006.01)

(52) U.S. Cl.
CPC .............. *F23L 11/00* (2013.01); *F23L 13/00* (2013.01); *F24H 8/006* (2013.01); *F23J 2900/13004* (2013.01); *Y02B 30/106* (2013.01)

(58) Field of Classification Search
CPC .......... F23L 11/005; F23L 13/06; F23L 11/00; F16T 1/22; F16T 1/20
See application file for complete search history.

(56) References Cited

U.S. PATENT DOCUMENTS

| | | | | |
|---|---|---|---|---|
| 4,770,160 A | * | 9/1988 | Schimmeyer | F16K 17/12 110/163 |
| 8,578,963 B2 | | 11/2013 | Richter | |
| 2007/0137706 A1 | * | 6/2007 | Stamatakis | F16T 1/20 137/192 |
| 2016/0123585 A1 | * | 5/2016 | Okamoto | F23L 17/00 110/188 |

FOREIGN PATENT DOCUMENTS

| CA | 2883497 A1 | * | 1/2015 | ............. F23L 17/00 |
|---|---|---|---|---|
| FR | 2847658 A1 | * | 5/2004 | ............. F23L 13/00 |

* cited by examiner

*Primary Examiner* — Jason Lau

(57) ABSTRACT

A non-return valve having an accumulation damper movable relative to a housing and shaped like a bowl to accumulate condensate running down from the chimney. The non-return valve has a smaller floating damper made of a material having a density less than water for resting against the accumulation damper when the appliance is in standstill and sealing the drainage holes in the accumulation damper when the condensate accumulation is below a threshold. Once condensate accumulates in the accumulation damper beyond the threshold, the floating damper is buoyed by the condensate thereby breaking the seal with the drainage holes and permitting the condensate to drain through drainage holes in the accumulation damper. When the appliance is operational, exhaust from the appliance lifts the floating damper and, in some cases, the accumulation damper also, to permit exhaust of combustion gases up the chimney.

24 Claims, 16 Drawing Sheets

NON-RETURN VALVE FOR FLUE GAS VENTING AND DAMPER ASSEMBLY FOR USE THEREIN

FIELD OF THE INVENTION

This invention relates to damper assemblies and non-return valves for use in chimneys. More particularly, this invention relates to non-return valves for collecting condensate from the chimney.

BACKGROUND OF THE INVENTION

In the past, there have been many different types of non-return valves for flue gas venting. During the normal operation, water often condenses in the chimney. To accommodate for this condensate, prior art devices provide a condensate trap. However, many prior art designs require pre-filling of the condensate trap to prevent hazardous flue gas from entering the appliance or property. Furthermore, such condensate traps cannot be permitted to become dry, otherwise they would no longer be operational. Moreover, many prior art devices do not facilitate servicing, such as cleaning and replacing, of the dampers or floats without having to dismount the non-return valve from the piping system of the chimney.

SUMMARY OF THE INVENTION

Accordingly, it is an object of this invention to at least partially overcome some of the disadvantages of the prior art. Also, it is an object of this invention to provide an improved type of non-return valve for flue gas venting which has a condensate trap which does not require pre-filling to operate and may be built into the unit as an integral part.

Accordingly, in one of its aspects, the present invention resides in a non-return valve for use in a chimney of an appliance, said valve comprising: a housing having a lower opening in fluid communication with an upper opening; an accumulation damper for accumulating condensate and comprising drainage holes for draining the condensate; an accumulation damper seat near the lower opening of the housing for receiving the accumulation damper and extending substantially across the lower opening; and a floating damper formed of a material having a lower density than water for resting against the accumulation damper and sealing the drainage holes when a volume of condensate accumulated in the accumulation damper is below a threshold, and, wherein when the volume of condensate accumulated is above the threshold, the floating damper is buoyed by the condensate breaking the seal with the drainage holes to permit drainage of the condensate through the drainage holes.

In a further aspect, the present invention resides in a damper assembly for use in a chimney of an appliance having a combustion device, said damper assembly comprising: an accumulation damper for accumulating condensate from the chimney, said accumulation damper having drainage holes for draining the condensate; a floating damper formed of a material having a density lower than the density of water; a floating damper seat on the accumulation damper for receiving the floating damper and providing a seal with the drainage holes; and wherein the floating damper rests on the floating damper seat of the accumulation damper when insufficient condensate has been accumulated in the accumulation damper to buoy the floating damper, and when sufficient condensate has been accumulated to buoy the floating damper, the floating damper floats above the accumulation damper breaking the seal and permitting condensate to drain through the drainage holes.

In one aspect, this damper assembly has no limit on the amount of back pressure that can act on the non-return valve as there is no pre-filled condensate trap. Also, the damper assembly does not require pre-filling of any condensate trap. Rather, the natural buoyancy force from the condensate itself collected in the larger accumulation float or damper acts as a trigger to permit drainage of the condensate once the condensate reaches a certain threshold. This threshold will generally be a function of the volume of accumulated condensate and the density and weight of the floating damper so as to displace the floating damper when resting in the accumulation damper.

The floating damper is formed of a material having a lower density than water to permit the floating damper to float by the buoyancy force created by the accumulated condensate. Preferably, the floating damper is made of a polypropylene or similar material that has a lower density or specific gravity and, more particularly, has a relatively low density or specific gravity than water which is the principal constitute of the condensate. In this way, when the volume displaced by the floating damper is equal to the volume of the condensate accumulated, the net buoyancy force will elevate the floating damper.

In a further preferred embodiment, the damper assembly and the valve have a guiding structure to guide the movement of the floating damper with respect to the accumulation damper. In a preferred embodiment, the guiding structure comprises a guide pin substantially concentrically located within the floating damper and accumulation damper such that the floating damper and the accumulation damper can move along the pin within the housing of the non-return valve.

Further aspects of the invention will become apparent upon reading the following detailed description and drawings, which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

Preferred embodiments of the invention and its advantages can be understood by referring to the present drawings. In the present drawings, like numerals are used for like and corresponding parts of the accompanying drawings.

Figure 1:
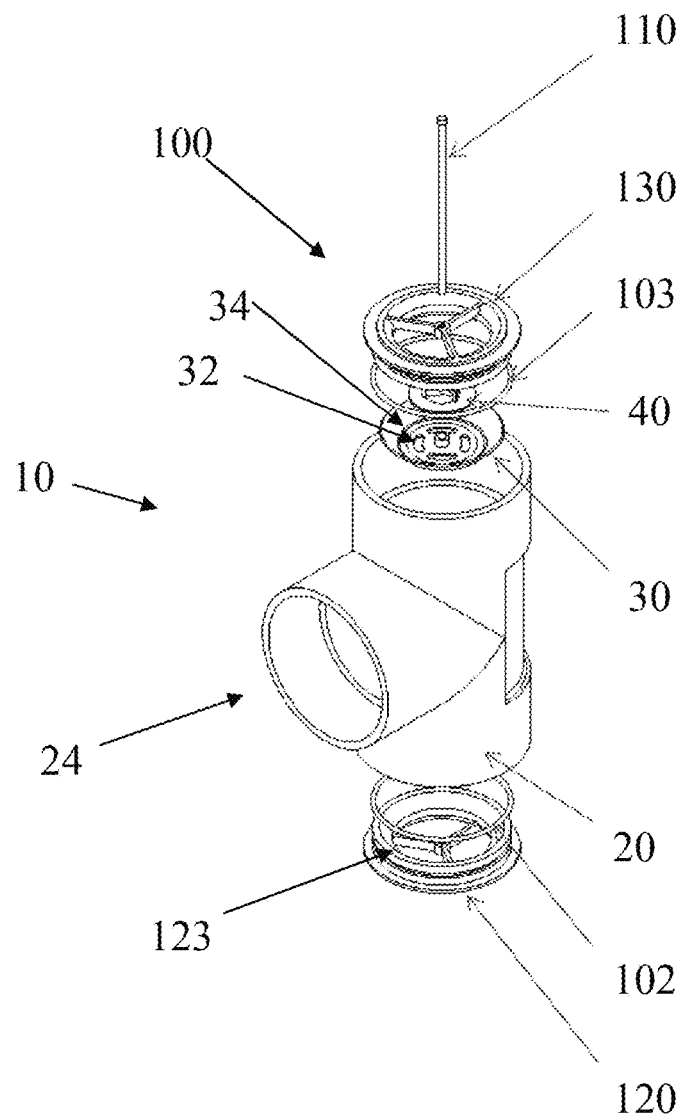
FIG. 1 illustrates an exploded perspective view of a non-return valve according to one embodiment of the present invention.

As shown in FIG. 1, one embodiment of the present invention relates to a non-return valve, shown generally by reference numeral 10, in an exploded perspective view. In general, the non-return valve 10 would be used in a chimney 8 of an appliance shown generally by reference numeral 6 for instance in FIG. 2, to prevent flue gas from returning, but at the same time permitting the accumulation and disposal of condensate from the chimney 8.

As illustrated in FIG. 1, the non-return valve 10, in one embodiment, comprises a housing, shown generally by reference numeral 20. The housing 20 in this embodiment has a lower opening 22 and an upper opening 23. In this embodiment, the housing 20 may also comprise a further side opening 24. The side opening 24 may be used for a number of different purposes, such as access to the internal components of the non-return valve 10, for inspection, cleaning or servicing, as well as sampling of the flue gas. It is understood that the side opening 24 is optional and may not be necessary nor desirable in all embodiments.

The non-return valve 10 further comprises an accumulation damper, shown generally by reference numeral 30, and, a floating damper, shown generally by reference numeral 40. The accumulation damper 30 accumulates condensate from the chimney 8. The accumulation damper 30 also preferably comprises drainage holes 32 for draining the condensate. Thus, the accumulation damper 30 initially accumulates the condensate and then the drainage holes 32 drain the condensate as discussed more fully below.

The floating damper 40 as shown in FIG. 1 is movable in the axial direction with respect to the accumulation damper 30. The accumulation damper 30 preferably comprises a floating damper seat 34 upon which the floating damper 40 may rest when the appliance 6 is in stand still. When the floating damper 40 rests on the floating damper seat 34 of the accumulation damper 30, the floating damper 40 seals the drainage holes 32. In this way, condensate may accumulate in the accumulation damper 30 without passing through the drainage holes 32, in part because of the seal created between the floating damper 40 and the drainage holes 32. The floating damper 40 resting on the floating damper seat 34 also seals the drainage holes 32 during stand still to block, or at least decrease, flue gas from returning into the appliance 6. In a preferred embodiment, a tapered seal 50 is formed between the accumulation damper 30 and the floating damper 40 to prevent water from passing through the drainage holes 32 until the appropriate time.

In a preferred embodiment, the floating damper 40 is formed of a material having a lower density than the condensate, which is predominantly formed of water. In a preferred embodiment, the floating damper 40 may be formed from plastic, such as polypropylene, but could be made from other floating materials, whether synthetic or natural, such as wood. For example, the floating damper 40 may have a density of 0.80 and 0.95 grams per cubic centimeters, and in general, the density of water is about 1.0 grams per cubic centimeter depending on a number of factors, such as temperature, and the constituent elements of the water, in this case the condensate from the chimney 8. As such, when a sufficient volume of condensate is accumulated in the accumulation damper 30, the condensate will cause the floating damper 40 to become buoyed, thereby breaking the seal with the drainage holes 32 to permit drainage of the accumulated condensate through the drainage holes 32. As such, while the volume of the condensate that has been accumulated in the accumulation damper 30 is below a threshold (which threshold could be a function of the precise density of the floating damper 40, as well as the overall shape of the floating damper 40 and the accumulation damper 30, as well as the density of the condensate being accumulated) the floating damper 40 will continue to rest against the accumulation damper 30 sealing the drainage holes 32 and preventing drainage of the condensate. However, when the volume of condensate accumulated in the accumulation damper 30 is above the threshold, the floating damper 40 becomes buoyed by the condensate, thereby breaking the seal with the drainage holes 32, and permitting drainage of the condensate through the drainage holes 32. In this way, the non-return valve 10 can continue to prevent the non-return of flue gas from the chimney 8 while at the same time accumulating condensate until the volume of condensate accumulated in the accumulation damper 30 exceeds the threshold at which time the floating damper 40 is buoyed by the condensate disposing of condensate accumulated from the chimney 8.

The non-return valve 10 also preferably comprises a guide structure, shown generally by reference numeral 100. The guide structure 100 may comprise a guide projection or pin 110 which preferably concentrically orients the floating damper 40 with respect to the accumulation damper 30 so that the floating damper 40 is returned by gravity to the floating damper seat 34. The guide pin 100 also concentrically orients the floating damper 40 and accumulation damper 30 within the housing 20. The guide pin 110 guides and restricts the movement of the dampers 30, 40 in an axial path relative to each other, 30, 40, and also relative to the housing 20. Thus, the floating damper 40 may move axially relative to the accumulation damper 30 as well as the housing 20. This permits the floating damper 40 and the accumulation damper 30 to move relative to each other depending on the force of the exhaust gas emanating from the appliance 6. This also permits the floating damper 40 to be buoyed by the condensate with respect to the accumulation damper 30.

The guide structure 100 preferably also comprises an upper guide web 130, located at the upper opening 23 of the housing 20, and a lower guide web 120 located at the lower opening 22 of the housing 20. As also illustrated in FIG. 1, preferably O-ring 102 is used to provide a seal for the lower guide web 120 against the housing 20 and O-ring 103 is used to provide a seal for the upper guide web 130 against the housing 20. The upper and lower guide webs 120, 130 assist in orienting the guide pin 110 within the housing 20 to guide movement of the floating damper 40 and the accumulation damper 30 relative to the housing 20 and relative to each other. Furthermore, the lower guide web 120 preferably comprises an accumulation damper seat 123 for receiving the accumulation damper 30. It is understood that the accumulation damper 30 may move upwards due to the air pressure caused by the exhaust gas of the appliance 6 but, when the exhaust gas is not sufficient to lift the accumulation damper 30, gravity will cause the accumulation damper 30 to return to the accumulation damper seat 123 by moving the accumulation damper 30 along the guide pin 110 to rest against the accumulation damper seat 123.

Preferably, the upper guide web 130 and lower guide web 120 have a similar shape. This may assist in manufacturing the non-return valve 10 by requiring fewer types of component parts.

As illustrated in FIG. 1, and as discussed above, in a preferred embodiment the housing 20 is oriented with respect to gravity such that the upper opening 23 is above the lower opening 22. Furthermore, preferably the housing 20 is oriented substantially vertically, both for the proper operation and relative movement of the accumulation damper 30 and floating damper 40 by gravity and air pressure from the exhaust gas, and also to permit the exhaust gas to leave the appliance 6. However, it is understood that in some embodiments, a forced exhaust gas arrangement may be present, whereby a blower or other type of venting device (not shown) is activated when the appliance 6 operates in order to force the exhaust gas out through the non-return valve 10.

Figure 2:
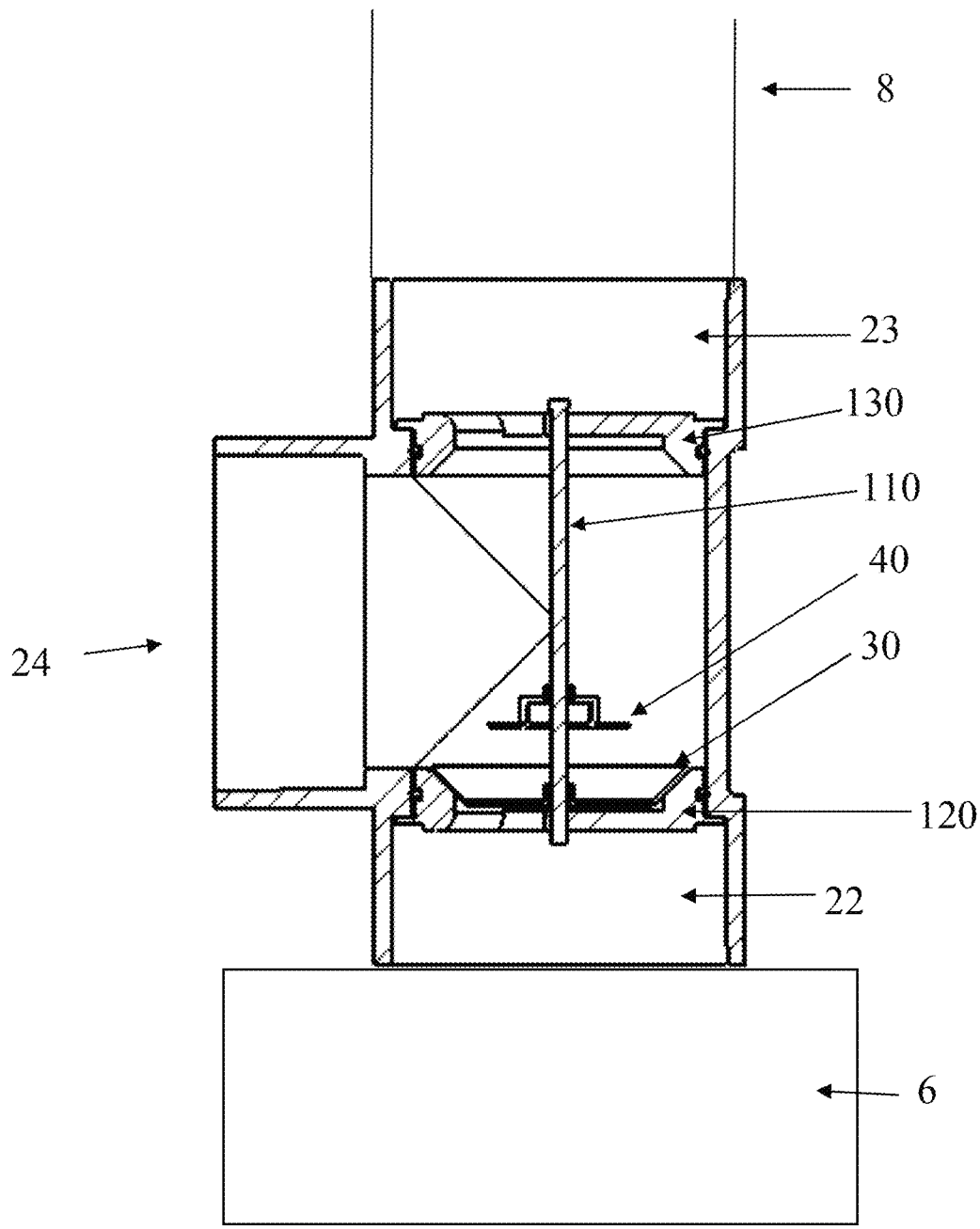
FIG. 2 illustrates a cross-sectional view of the non-return valve shown in FIG. 1 at a first operating state of the appliance according to one embodiment of the present invention.
Figure 3:
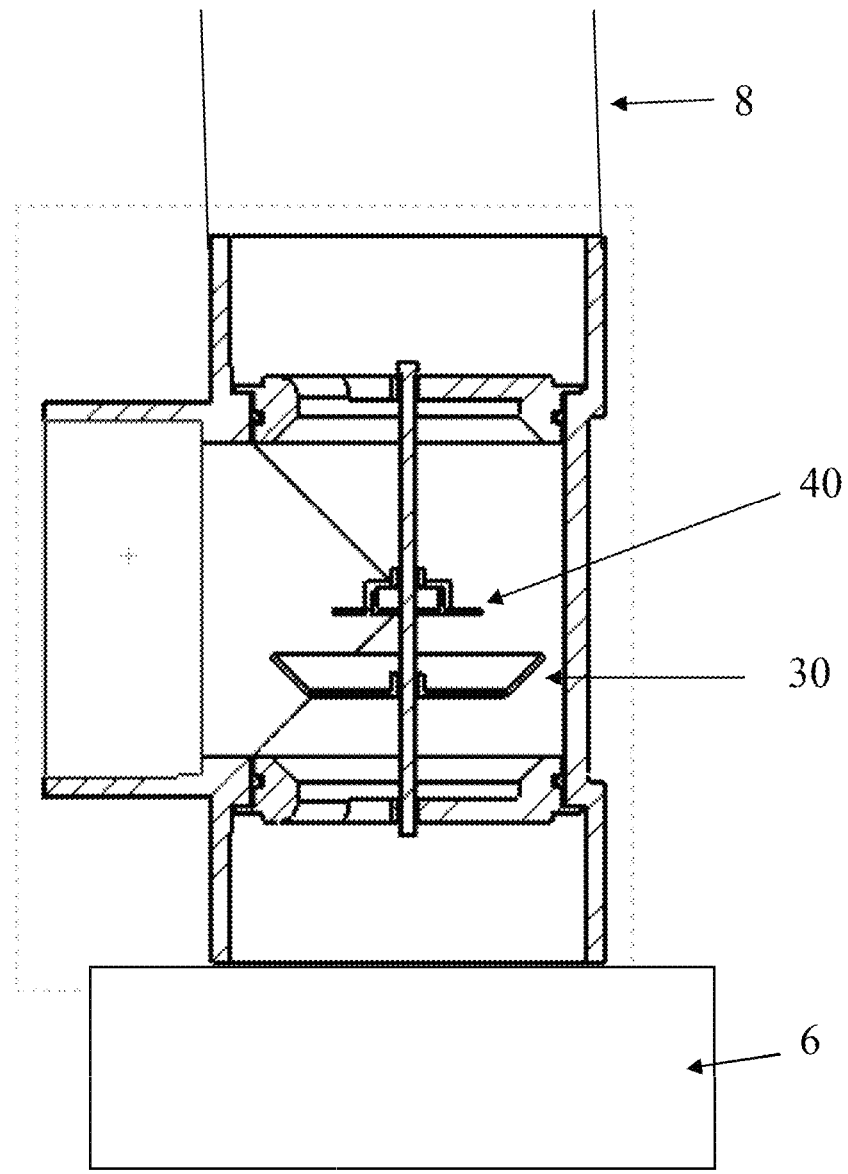
FIG. 3 illustrates a cross-sectional view of the non-return valve shown in FIG. 1 at a second operating state of the appliance higher than the first operating state according to one embodiment of the present invention.
Figure 4:
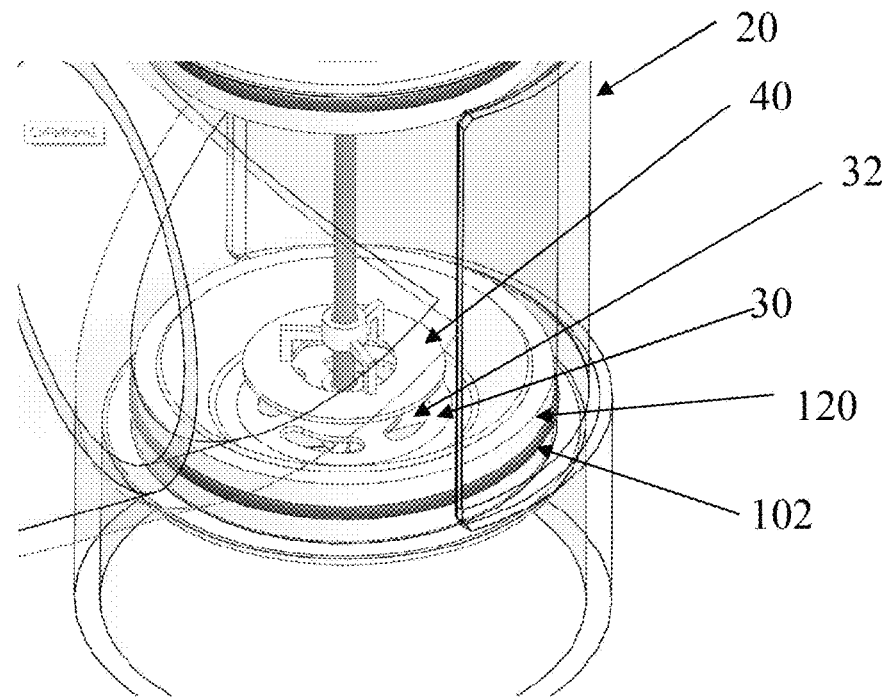
FIG. 4 is a perspective view of the non-return valve shown in FIG. 1 at a first operating state of the appliance and the housing shown as transparent for ease of illustration according to one embodiment of the present invention.

FIGS. 2, 3 and 4 illustrate operation of the non-return valve 10 at different operating states of the appliance 6 according to one preferred embodiment of the invention. As illustrated in FIG. 2, when the appliance 6 is operating at a first level having a relatively low air pressure coming from the lower opening 22, only the floating damper 40 may be raised or moved axially along the guide pin 110 and the accumulating damper 30 remains resting against the accumulation damper seat 123 formed by the lower guide web 120. In this case, the first level of operation the appliance 6 would be above stand still, but below a higher second level of operation having a higher air pressure coming from the exhaust gas of the appliance 6. In the first level of operation, the relatively low air pressure of the exhaust gas may not be sufficient to lift the accumulation damper 30, but may pass through the drainage holes 32 and lift the floating damper 40.

FIG. 3 illustrates the operation of the appliance 6 at a second level of operation, higher than the first level of operation, where the air pressure generated by the exhaust gas of the appliance 6 is higher than the air pressure generated at the first level. In this case, the higher air pressure at the second level of operation coming from the lower opening 22 is sufficient to lift the accumulation damper 30 and the floating damper 40 relative to the lower housing 20 in an axial direction along the guide pin 110.

One advantage of at least some embodiments of the present invention is that there is a reduced pressure drop across the non-return valve 10. Specifically, in at least some preferred embodiments, a pressure drop of about 0.11 inches (0.28 cm) water column was measured at the first level of operation of the appliance 6 having a lower air pressure of exhaust gas. In similar preferred embodiments, a pressure drop of about 0.33 inches (0.84 cm) water column was measured at the second level of operation of the appliance 6 having a higher air pressure of exhaust gas. It is noted that these measurements were made across the non-return valve 10 between the lower opening 22 and the higher opening 23. Accordingly, at least some embodiments of the present invention facilitate a reduced pressure drop across the return valve 10 from the lower opening 22 and the upper opening 23. Therefore, this may improve the efficiency of the overall non-return valve 10, appliance 6 and chimney 8 combination.

Thus, the air pressure generated by operation of the appliance 6 may lift the floating damper 40 only, or both the floating damper 40 and accumulation damper 30. It is understood that, in either case, once the appliance 6 returns to stand still, the accumulation damper 30 would return to the accumulation damper seat 123 and the floating damper 40 would return to the floating damper seat 34 through gravity.

FIG. 4 illustrates the floating damper 40 slightly above the accumulation damper 30 and with the accumulation damper 30 resting against the accumulation damper seat 123. For ease of illustration, the housing 20 is shown as being transparent, although this likely would not be the case in operation. The position of the floating damper 40 in FIG. 4 reflects the position shown in FIG. 2 where only the floating damper 40 has been displaced vertically by the lower air pressure of exhaust gas from the appliance 6 operating, for instance, at the first or lower level of operation. It is understood that at this lower level, any condensate that may have been accumulated in the accumulation damper 30 may be dissipated or displaced by the exhaust gas and/or pass through the drainage holes 32 and drain even though the appliance 6 is operational.

Figure 5:
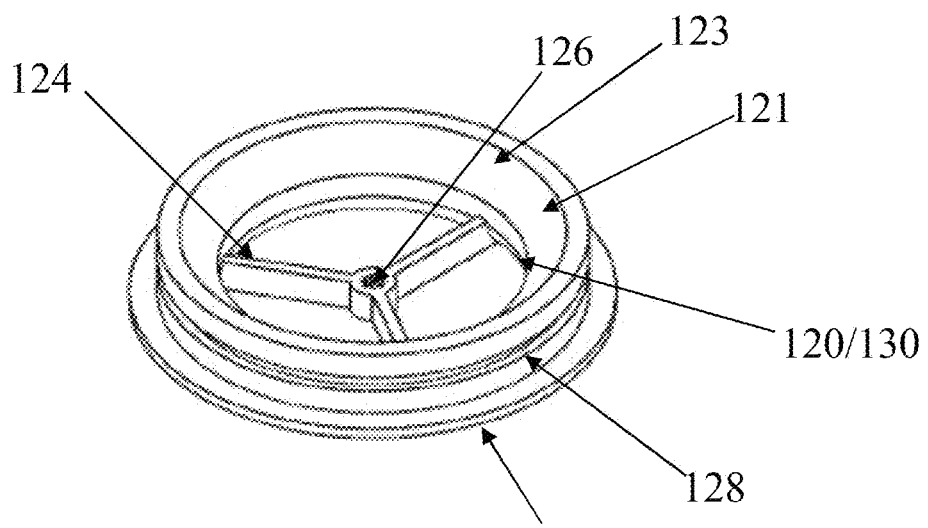
FIG. 5 is a perspective view of a guide web element according to one embodiment of the present invention.

FIG. 5 illustrates a perspective view of the guide web element 120,130 according to one preferred embodiment of the present invention. As indicated above, in a preferred embodiment, the upper guide web 130 and lower guide web 120 may have substantially the same shape in order to decrease the number of component parts, and therefore the manufacturing cost of the non-return valve 10. As illustrated in FIG. 5, the guide web 120, 130 may have a central opening 126 for receiving and holding the guide pin 110. The central opening 126 may be contained in a cylindrical member 132 supported by at least one, and preferably three, radially inwardly projecting webs 124. The guide web 120, 130 may also have a slanted surface 121 which would act as the accumulation damper seat 123 when the guide web element 120, 130 is acting as the lower guide web 120. The guide web element 120, 130 may also have a radial channel 128 to receive the O-rings 102, 103 respectively. The guide web elements 120, 130 with O-rings 102, 103 may be secured to the housing 20 through a friction fit. The guide web elements 120, 130 may also preferably comprise a radial flange 129 for mating against or connecting to the housing 20 and may be secured to the housing 20, such as by use of an adhesive. Alternatively, the housing 20 may be integrally formed with the guide web elements 120, 130.

Figure 6A:
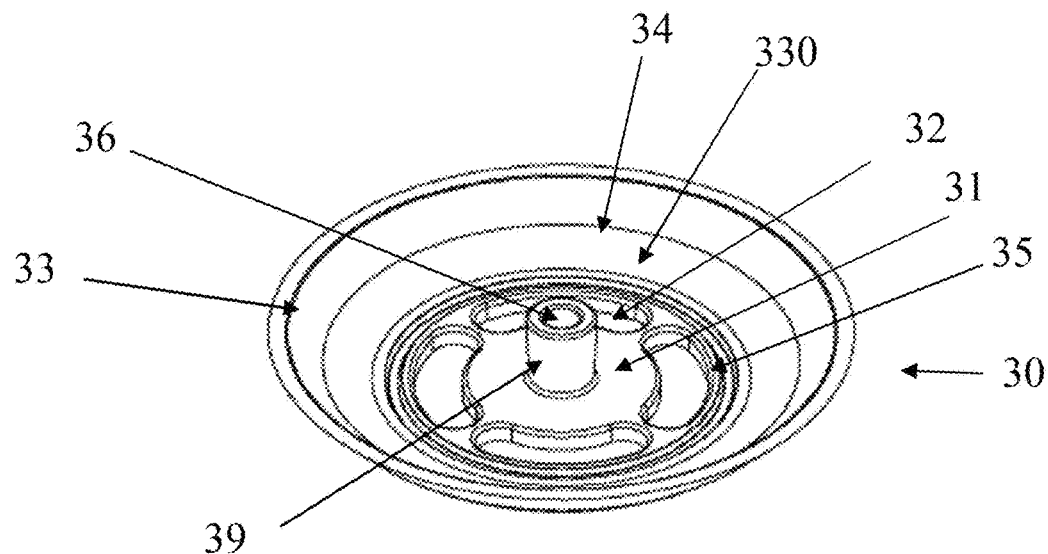
FIG. 6A is a perspective view of an accumulation damper according to one embodiment of the present invention.

FIG. 6A illustrates a perspective view of the accumulation damper 30 according to one preferred embodiment of the present invention. As illustrated in FIG. 6A, the accumulation damper has drainage holes 32 for draining the condensate that has been accumulated. In FIG. 6A, the accumulation damper 30 is shown having four (4) drainage holes 32 in the central web 31. It is understood that different numbers of drainage holes 32 and shapes of the drainage holes 32 may be used and the present invention is not limited to four (4) drainage holes 32. When the appliance 6 is in standstill, the floating member 40 will rest against the floating damper seat 34 sealing the drainage holes 32 until sufficient condensate has been accumulated to buoy the floating damper 34. The accumulation damper 30 also preferably comprises a central opening 36 for receiving the projecting pin 110. In this way, the accumulation damper 35 may move relate to the housing 20 and/or the floating damper 40 along the guide pin 110. The central opening 36 is contained within a cylindrical member 39 which may be integrally formed with the central web 31. Preferably, the central opening 36 has a diameter which is greater than the outer diameter of the projecting pin 110 to permit easy axial movement of the accumulation damper 30 with respect to the housing 20.

The accumulation damper 30 also preferably comprises a condensate accumulation area 330 located generally near and around the drainage holes 32. The accumulation damper area 330 is formed in part by the slanted surface 33 as well as the central area 31. The condensate accumulation area 330 will accumulate the condensate in order to permit the condensate to eventually buoy the floating member 40.

Figure 6B:
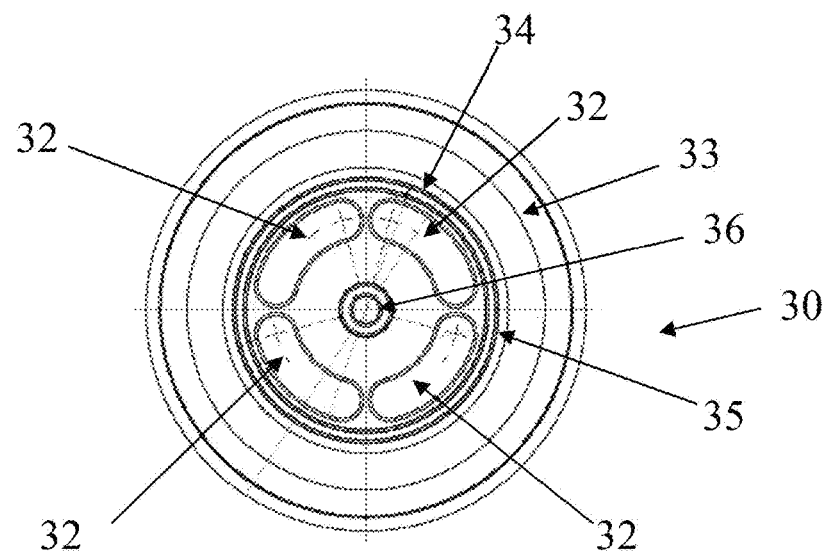
FIG. 6B is a top plan view of the accumulation damper shown in FIG. 6A.

FIG. 6B illustrates a top view of the accumulation damper 30. As illustrated in FIG. 6B, the central opening 36 is substantially oriented in the center of the accumulation damper 30 to permit balanced and even movement of the accumulation damper 30 by the exhaust gas of the appliance 6. As also illustrated in FIG. 6B, the drainage openings 32 are preferably symmetrically located about the central opening 36. This also is designed to facilitate balanced movement of the accumulation damper 30 by the exhaust gas and also balanced and even movement of the floating member 40 from the floating damper seat 34. It is understood that the floating damper 40 will substantially cover or occlude the drainage holes 32 when the floating damper 40 rests on the floating damper seat 34 in order to seal the drainage holes 32 to prevent flue gas from returning, and, also, retain the condensate in the condensate accumulation area 330.

Figure 6C:
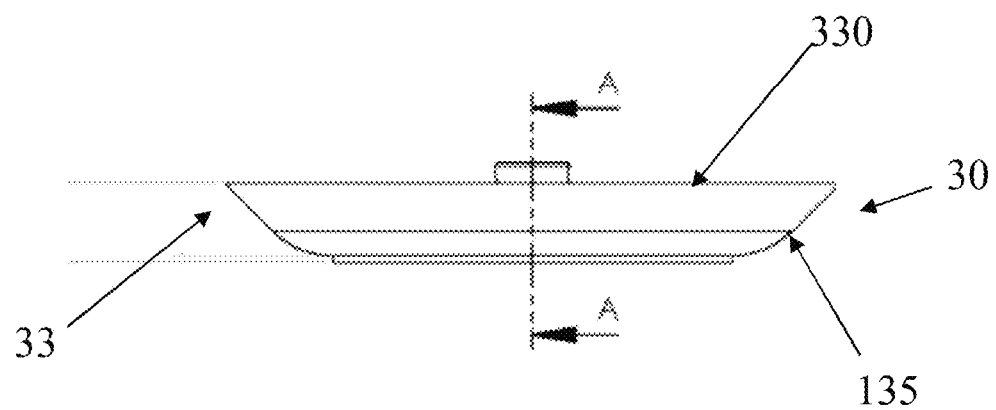
FIG. 6C is a side view of the accumulation damper shown in FIG. 6A.
Figure 6D:
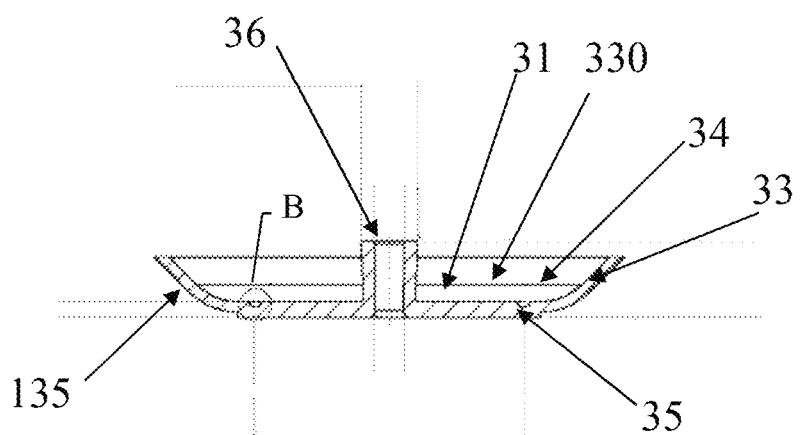
FIG. 6D is a cross-sectional view taken along line A-A of FIG. 6C.

FIG. 6C shows a side view of the floating damper 30 and FIG. 6D shows a cross-section of the floating damper 30 taken along lines A-A of FIG. 6C. As illustrated in FIGS. 6C and 6D, the accumulation damper 30 forms a substantially "bowl-like" shape to permit accumulation of the condensate in the condensate accumulation area 330. To accomplish this, the slanted surface 33 of the accumulation damper 30 is somewhat conically shaped, or at least has a frusto-conical shape, which, together with the central web 31, assists in accumulating condensate from the chimney 8 in the condensate accumulation area 330. As also illustrated in FIGS. 6C and 6D, the accumulation damper 30 comprises an accumulation damper seat contact surface 135 which contacts the accumulation damper seat 123 of the lower guide web 120 when the air pressure generated by the exhaust gas of the appliance 6 is not sufficient to lift the accumulation damper 30.

Figure 6E:
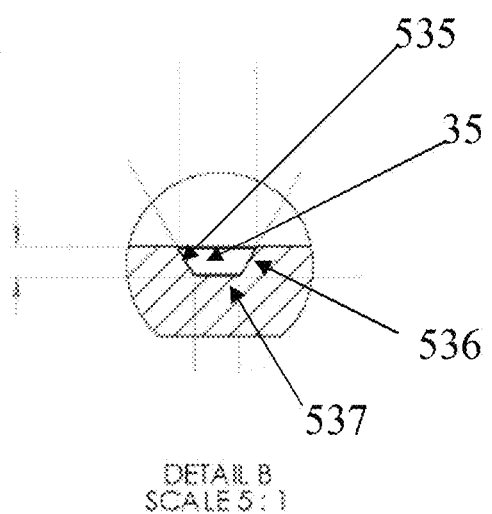
FIG. 6E is a detail view of the detail B show in FIG. 6D.

FIGS. 6A and 6D also illustrate an axially extending radial groove, shown generally by reference numeral 35, which extends axially into the accumulation damper 30 a short distance preferably near or in the condensate accumulation area 330. The axially extending radial groove 35 is shown in greater detail in FIG. 6E which is a detail view of area B in FIG. 6D. As illustrated in FIG. 6E, the axially extending radial groove 35 may comprise an outer axially extending radial surface 535, an inner axially extending radial surface 536 and a bottom axially extending radial surface 537. As discussed below, the axially extending radial groove 35 will receive a corresponding axially extending radial ridge 45 of the floating damper 40 to assist in orienting the floating damper 40 in the floating damper seat 34 and seal the drainage holes 32. To accomplish this, preferably the outer axially extending radial groove surface 535 and the inner axially extending radial groove surface 536 may be tapered by having an oblique angle with respect to the bottom axially extending radial groove surface 537 which cooperates with the axially extending radial ridge 45 to assist in receiving and orienting the floating damper 40 with respect to the accumulation damper 30 and create a tapered seal 50. It is understood that the floating damper 40 will be oriented with respect to the accumulation damper 30 so as to cover or occlude the drainage holes 32 in order to create the tapered seal 50.

Figure 7A:
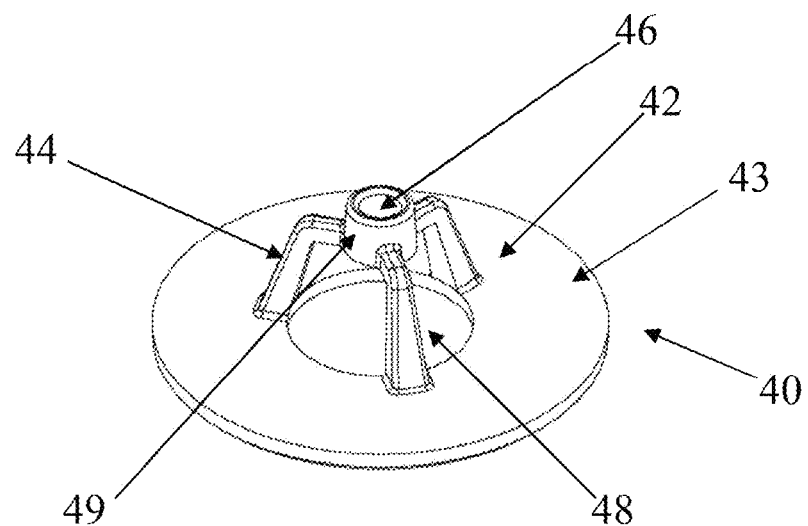
FIG. 7A is a perspective view of a floating damper according to one embodiment of the present invention.

FIG. 7A illustrates a perspective view of the floating damper 40 according to one embodiment of the present invention. As illustrated in FIG. 7A, the floating damper 40 has an upper surface 42 and a lower surface 41 (see FIG. 7C). The floating damper 40 also has axially projecting members 44 extending from a cylindrical member 49 which contains a central opening 46 to a main body 43. The central opening 46 cooperates with a projecting pin 110 to permit the relative movement of the floating member 40 with respect to the accumulation damper 30 and the housing 20. Preferably, the central opening 36 has a diameter which is generously larger than the outer diameter of guide pin 110 to permit easy axial movement of the floating damper 40 with respect to the guide pin 110.

The main body 43 of the floating damper 40 may be toroidially shaped, as shown in FIG. 7A, having a larger opening 48 in the center. Such a design would permit the lower surface 41 of the floating damper 40 to cover or occlude the drainage holes 32 while at the same time keeping the weight, and therefore overall density, of the floating damper 40 below that of water so that the floating damper 40 may be buoyed by the condensate accumulated in the condensate accumulation area 330 of the accumulation damper 30.

Figure 7B:
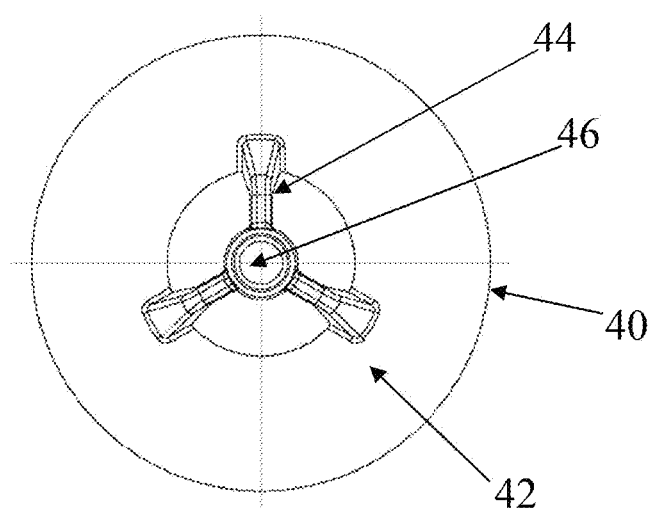
FIG. 7B is a top plan view of a floating damper shown in FIG. 7A.
Figure 7C:
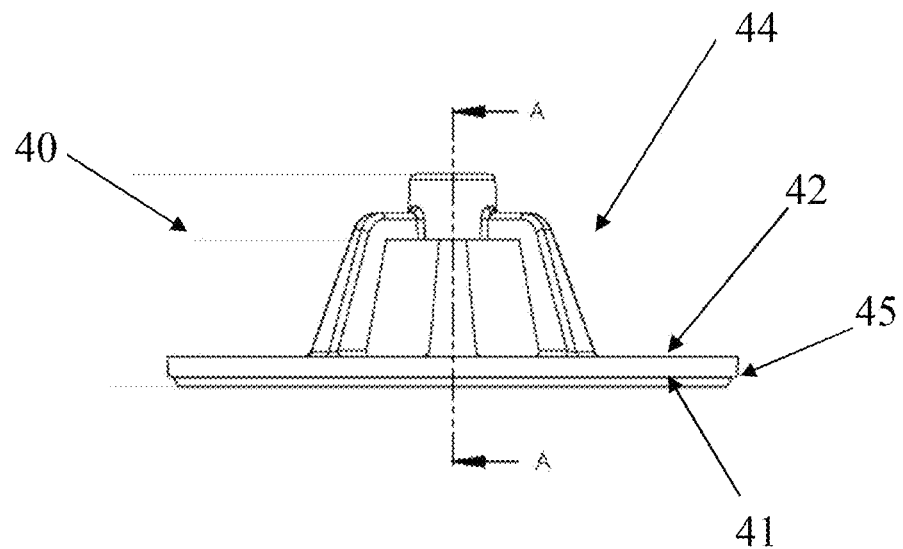
FIG. 7C is a side view of a floating damper shown in FIG. 7A.
Figure 7D:
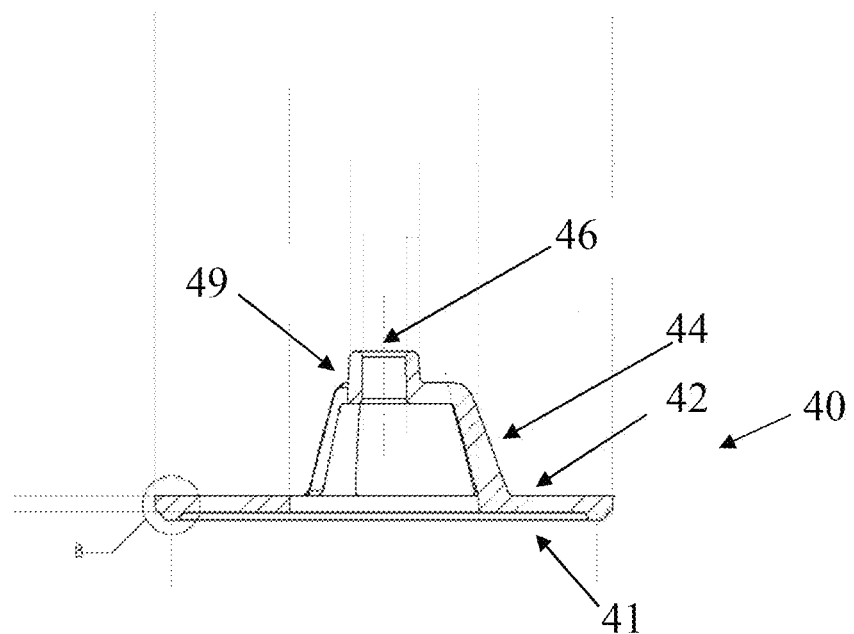
FIG. 7D is a cross-sectional view taken along line A-A of FIG. 7C.

FIG. 7B illustrates a top view of the floating damper 40 according to one preferred embodiment of the present invention, and, FIG. 7C illustrates a side view of the floating damper 40 according to one preferred embodiment of the present invention. As illustrated in FIG. 7C, the lower surface 41 of the accumulation damper 30 comprises an axially extending radial ridge, shown generally by reference numeral 45. FIG. 7D illustrates a cross-section of the floating damper 40 taken along line A-A of FIG. 7C. As illustrated in FIG. 7D, the lower surface 41 is essentially flat except for the axially extending radial ridge 45 so as to better mate with the floating damper seat 34 of the accumulation damper 30 and seal the drainage holes 32.

Figure 7E:
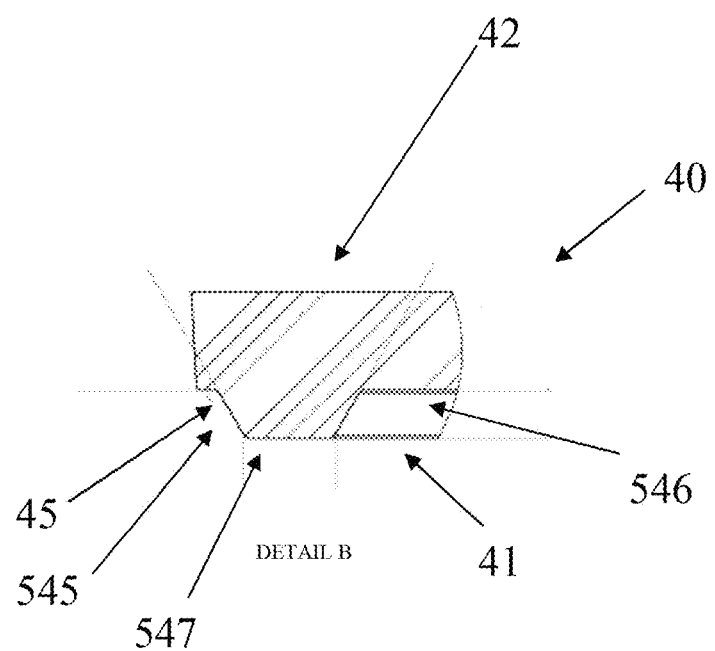
FIG. 7E is a detail view of the detail B show in FIG. 7D.

FIG. 7E illustrates a detail view of area B in FIG. 7D. As illustrated in FIG. 7E, the outer axially extending radial ridge surface 545, the inner axially extending radial ridge surface 546 and the bottom axially extending radial ridge surface 547 of the axially extending radial ridge 45, mate with the outer axially extending radial groove surface 535, the inner axially extending radial groove surface 536 and the bottom axially extending radial ridge surface 537 of the axially extending radial groove 35.

Preferably, the outer axially extending radial ridge surface 545 and the inner axially extending radial ridge surface 546 have an oblique angle with respect to the bottom axially extending radial ridge surface 547 to effectively create a trapezoidal cross-section as shown in FIG. 7c with the bottom surface 42 of the main body 43. Thus, in a preferred embodiment, the axially extending radial ridge surfaces 535, 536 and the axially extending radial ridge surfaces 545, 546 create a tapered seal 50 to better receive the floating damper 40 into the floating damper seat 34 of the accumulation damper 30. In this way, the axially extending radial ridge surfaces 545, 546 are tapered to correspond and cooperate with the axially extending radial groove surfaces 535, 536, which would also accommodate for any manufacturing tolerances between the components or relative radial movement of the floating damper 40 with respect to the accumulation damper 30. Also, the tapered axially extending radial groove surfaces 535, 536 would also assist in removing any condensate that may be present in the axially extending radial groove 35 and which was not displaced by movement of the accumulation damper 30.

Figure 8:
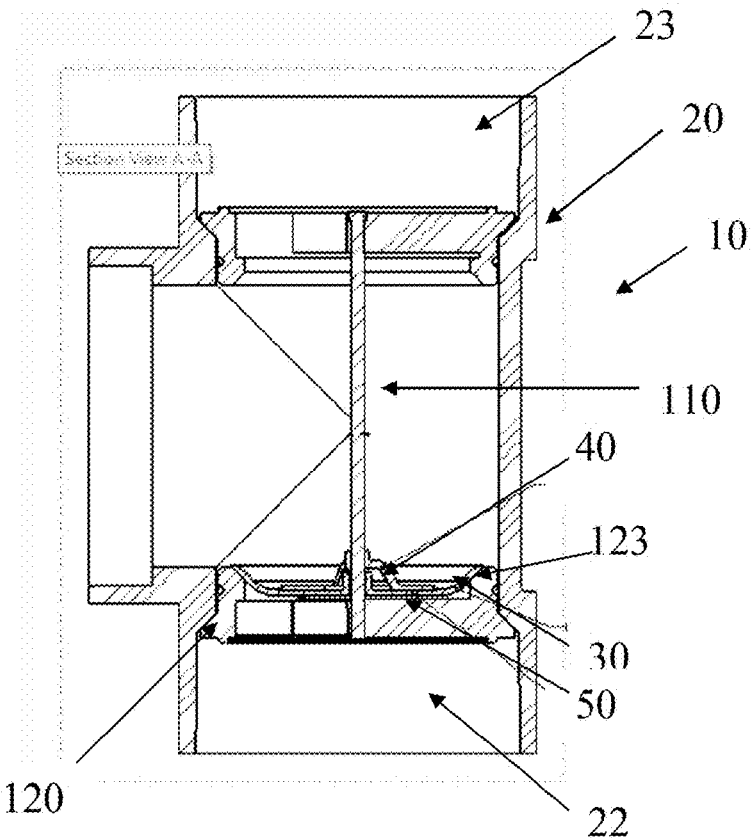
FIG. 8 is a cross-sectional view of the non-return valve shown in FIG. 1 with the appliance in standstill and no condensate accumulated in the accumulation damper according to one embodiment of the present invention.

FIG. 8 shows a cross-section of the non-return valve 10 also shown in FIG. 1 with the appliance 6 in standstill and no condensate accumulated in the condensate accumulation area 330 of the accumulation damper 30. Also illustrated in FIG. 8, the floating damper 40 is resting on the accumulation damper 30, and, the accumulation damper 30 is resting on the accumulation damper seat 123 and substantially across the lower opening 22. The floating damper 40 resting in the floating damper seat 34 of the accumulation damper 30 facilitates creation of the tapered seal 50. In this way, the combination of the floating damper 40 occluding the drainage holes 32 and the accumulation damper 30 extending substantially across the lower opening 22 effectively prevents or blocks the flue gas from returning down into the lower opening 22 from the upper opening 23. At the same time, if the appliance 6 is activated, exhaust gas will lift at least the floating damper 40 and, possibly, the accumulation damper 30 also if the air pressure generated by the appliance 6 is of a sufficiently high level to lift both dampers 30, 40.

Figure 9:
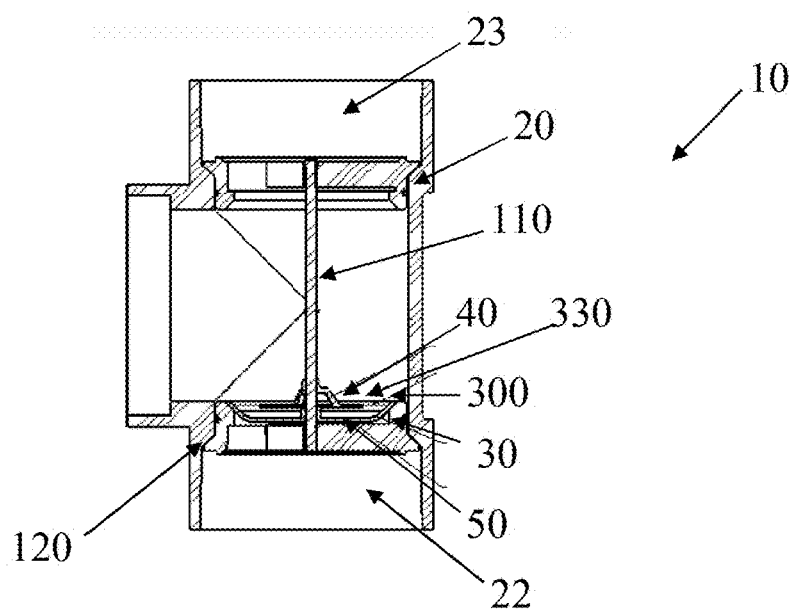
FIG. 9 is a cross-sectional view of the non-return valve shown in FIG. 8 with the appliance in standstill and with condensate accumulated in the accumulation damper according to one embodiment of the present invention.

FIG. 9 is a cross-sectional view of the non-return valve 10 as shown in FIG. 8 with the appliance 6 in standstill but with condensate, shown generally by reference numeral 300, accumulated in the accumulation damper 30. More specifically, the condensate 300 has accumulated in the accumulation area 330 of the accumulation damper 30. Once the volume of condensate 300 accumulated in the accumulation damper 30 is above or exceeds the threshold, the damper 40 will be buoyed by the condensate 300. Once the floating damper 40 is buoyed, the tapered seal 50 with the drainage holes 32 will be broken, thereby permitting drainage of the condensate 300 through the drainage holes 32. The guide pin 110 facilitates the relative movement of the floating damper 40 with respect to the accumulation damper 30 when it is buoyed by the condensate 300.

Figure 10:
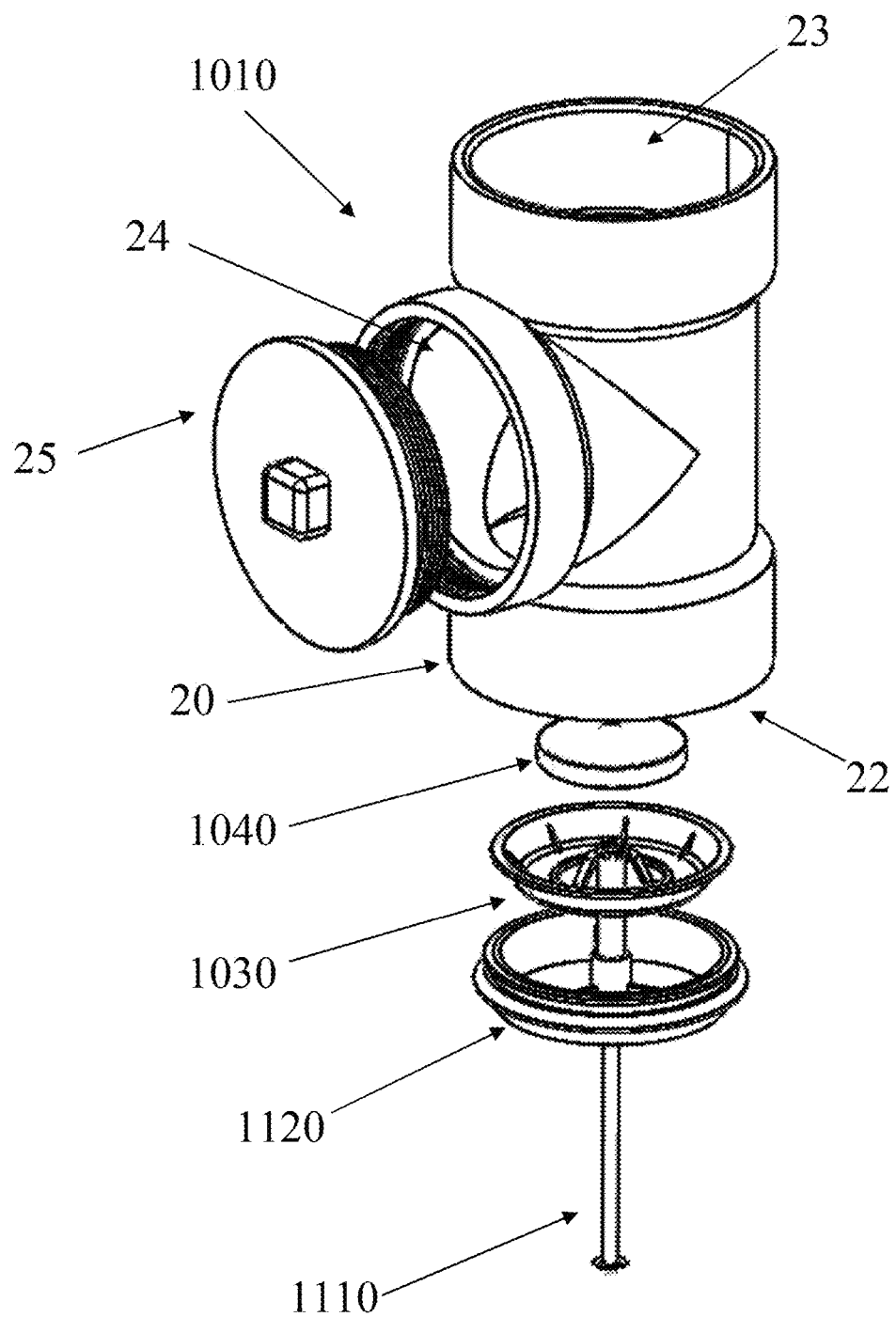
FIG. 10 illustrates an exploded perspective view of a non-return valve according to a further embodiment of the present invention.

FIG. 10 illustrates a further preferred embodiment of the present invention. As illustrated in FIG. 10, a non-return valve, shown generally by reference numeral 1010, is shown in exploded perspective view. As with the non-return valve 10 illustrated in FIGS. 1 to 9, the non-return valve 1010 could be used in a chimney 8 of an appliance 6 to prevent flue gas from returning, but, at the same time permitting accumulation and disposal of condensate from the chimney 8.

As illustrated in FIG. 10, and similar to the non-return valve 10 shown in FIG. 1, the non-return valve 1010 comprises a housing 20. The housing 20 in this embodiment has a lower opening 22 and an upper opening 23 and may also comprise a further side opening 24 similar to the non-return valve 10. The side opening 24 may be used for a number of different purposes, such as access to the internal components of the non-return valve 1010, for inspection, cleaning or servicing, as well as sampling of the flue gas, and, as shown in FIG. 10, the housing 20 may optionally have a closure 25 to temporarily close the side opening 24.

As also illustrated in FIG. 10, the non-return valve 1010 further comprises an accumulation damper 1030 and a floating damper 1040. The accumulation damper 1030 accumulates condensate from the chimney 8, similar to the accumulation damper 30 of the non-return valve 10. The accumulation damper 1030 also preferably has drainage holes 1032 for draining the condensate. Thus, the accumulation damper 1030 initially accumulates the condensate and then the drainage holes 1032 drain the condensate.

The floating damper 1040 of the non-return valve 1010 shown in FIG. 10 is movable in the axial direction with respect to the accumulation damper 1030. The accumulation damper 1030 preferably comprises a floating damper seat 1034 upon which the floating damper 1040 may rest when the appliance 6 is in stand still. When the floating damper 1040 rests on the floating damper seat 1034 of the accumulation damper 1030, the floating damper 1040 seals the drainage holes 1032. In this way, condensate 300, as shown for instance in FIGS. 11A and 11B, may accumulate in the accumulation damper 1030 without passing through the drainage holes 1032, in part because of the seal created by the floating damper 1040 resting upon the floating damper seat 1034 and sealing the drainage holes 1032. The floating damper 1040 resting on the floating damper seat 1034 of the accumulation damper 1030 also seals the drainage holes 1032 during stand still of the appliance 6 to block, or at least decrease or restrict, flue gas from returning into the appliance 6 through the drainage holes 1032.

Figure 11A:
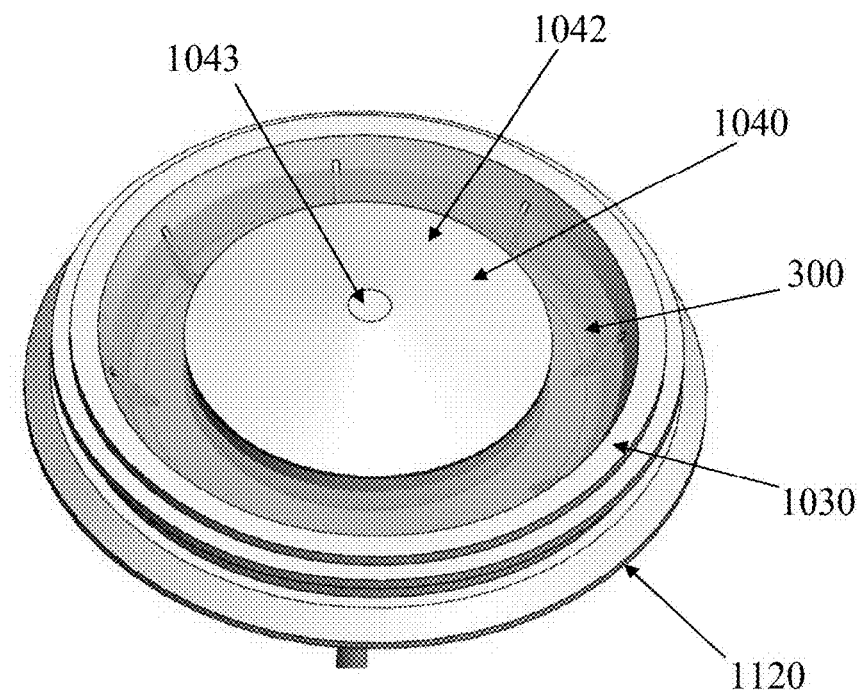
FIG. 11A is a perspective view of the floating damper, accumulation damper and lower guide web of the non-return valve shown in FIG. 10 with the appliance in standstill and with condensate accumulated in the accumulation damper.
Figure 11B:
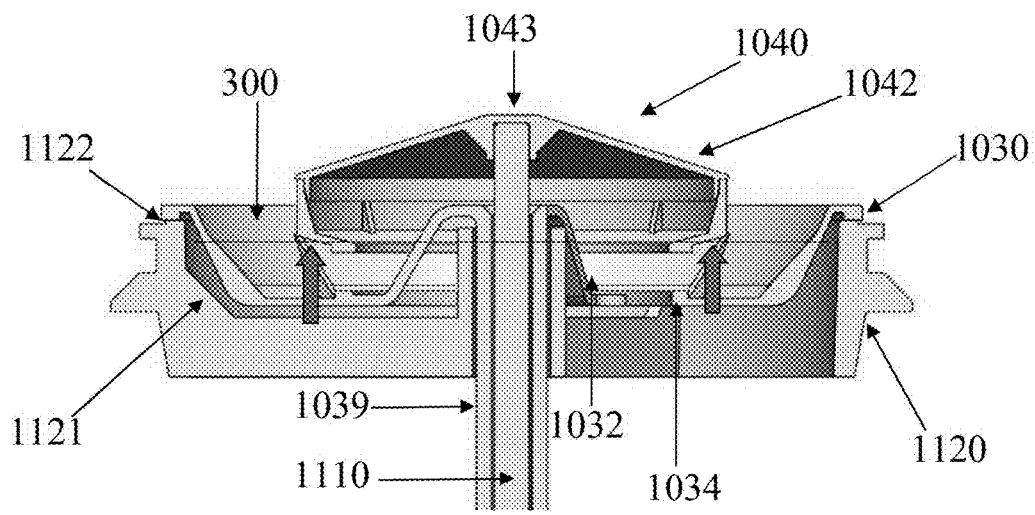
FIG. 11B illustrates a cross-sectional view of the floating damper, accumulation damper and lower guide web of the non-return valve shown in FIG. 11A with the appliance in standstill and with condensate accumulated in the accumulation damper.

When the volume of condensate 300 accumulated in the accumulation damper 1030 is above a threshold, as shown for instance in FIGS. 11A and 11B, the floating damper 1040 will become buoyant (shown by the upward arrows in FIG. 11B) and the floating damper 1040 will essentially float due to the accumulated condensate 300. This will break the seal between the accumulation damper 1030 and the floating damper 1040 and allow the condensate 300 to flow freely into the joining pipe (not shown) connected to the lower opening 22 of the housing 20. During the buoyancy state, when the volume of condensate 300 is above the threshold, as shown in FIG. 11B, the temporary opening created between the floating damper 1040 and the accumulation damper 1030 is filled by condensate 300 which prevents or at least restricts flue gas backflow, thus creating a wet seal for the flue gas backflow while permitting disposal of the accumulated condensate 300. As the condensate 300 level drops, buoyancy forces (shown by the arrows in FIG. 11B) diminish and gravity pulls the floating damper 1040 back to rest against the floating damper seat 1034.

Figure 11C:
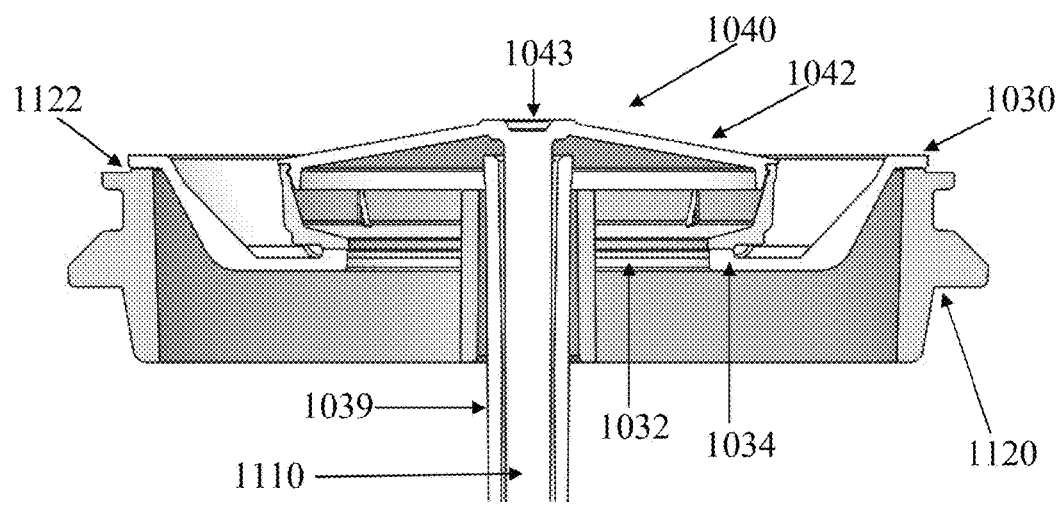
FIG. 11C illustrates a cross-sectional view of the floating damper, the accumulation damper, the lower guide web of the non-return valve shown in FIG. 11B with the appliance in standstill, but without any condensate accumulated in the accumulation damper.

Accordingly, in one preferred embodiment, the floating damper 1040 rests on the floating damper seat 1034 of the accumulation damper 1030 when no condensate or insufficient condensate 300, has been accumulated in the accumulation damper 1030 to buoy the floating damper 1040 as shown in FIG. 11C. When sufficient condensate 300 has been accumulated to buoy the floating damper 1040, the floating damper 1040 will float above the accumulation damper 1030 breaking the seal and permitting condensate 300 to drain through the drainage holes 1032 with the condensate 300 filling the temporary opening between the floating damper 1040 and the accumulation damper 1030 to prevent, or at least restrict, flue gas backflow. In this way, the floating damper 1040 and the accumulation damper 1030 create both a wet and dry seal mechanism (depending on whether or not the floating damper 1040 is buoyed by the condensate 300, or resting against the accumulated damper 1030), so that the flue gas is prevented, or at least restricted, from passing to the appliance 6 whether or not condensate is present in the accumulation damper 1030.

The non-return valve 1010 also preferably comprises a guide structure, shown generally by reference numeral 1100. The guide structure 1100 may comprise a guide projection or pin 1110 which preferably concentrically orients the floating damper 1040 with respect to the accumulation damper 1030 so that the floating damper 1040 is retuned by gravity to the floating damper seat 1034 as the buoyancy force diminishes by the volume of the condensate 300 decreasing or when the appliance 6 ceases to operate and returns to standstill. The guide pin 1110 also concentrically orients the floating damper 1040 and accumulation damper 1030 within the housing 20. The guide pin 1110 guides and restricts the movement of the dampers 1030 and 1040 in an axial path relative to each other, as well as relative to the housing 20. This permits the floating damper 1040 and the accumulation damper 1030 to move relative to each other depending on the force of the exhaust gas emanating from the appliance 6. This also permits the floating damper 1040 to be buoyed by the condensate 300 and move axially upward with respect to the accumulation damper 1030 to break the seal and permit condensate to drain through the drainage holes 1032, while still providing a wet seal restricting flue gas backflow into the appliance 6.

Figure 14:
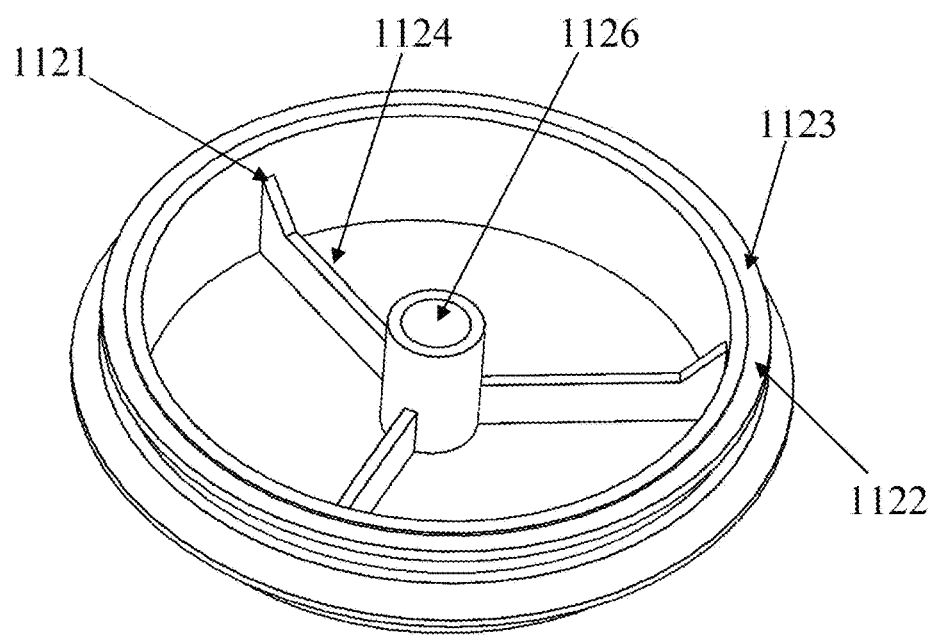
FIG. 14 is a perspective view of a guide web element according to the embodiment of the invention illustrated in FIG. 10.

The guide structure 1100 preferably also comprises a lower guide web 1120 located at the lower opening 22 of the housing 20. As illustrated in FIG. 10, the lower guide web 1120 assists in orienting the guide pin 1110 within the housing 20 to guide movement of the floating damper 1040 and the accumulation damper 1030 relative to the housing 20 and relative to each other. Furthermore, the lower guide web 1120 preferably comprises an accumulation damper seat 1123 (as shown in FIG. 14) for receiving the accumulation damper 1030. The lower web guide 1120 also comprises a slanted surface 1121 or an upper rim 1122, either of which, or both of which, could act as the accumulation damper seat 1123 to receive the accumulation damper 1030. Preferably, the lower guide web 1120 has a central opening 1126 for receiving and holding the guide pin 1110 as well as the tubular member 1039 of the accumulation damper 1030. When at standstill, the accumulation damper 1030 will rest against the accumulation damper seat 1123, whether the slanted surface 1121, or, the upper rim 1122, or both the upper rim 1122 and the slanted surface 1121 of the guide web 1120. Therefore, it is understood that the accumulation damper 1030 may move axially upwards due to the air pressure caused by the exhaust gas of the appliance 6, however, when the exhaust gas is not sufficient to lift the accumulation damper 1030, the accumulation damper 1030 will return to the accumulation damper seat 1123 of the lower guide web 1120 by the tubular member 1039 of the accumulation damper 1030 moving into the central opening 1126 of the lower web guide 1120.

Figure 16:
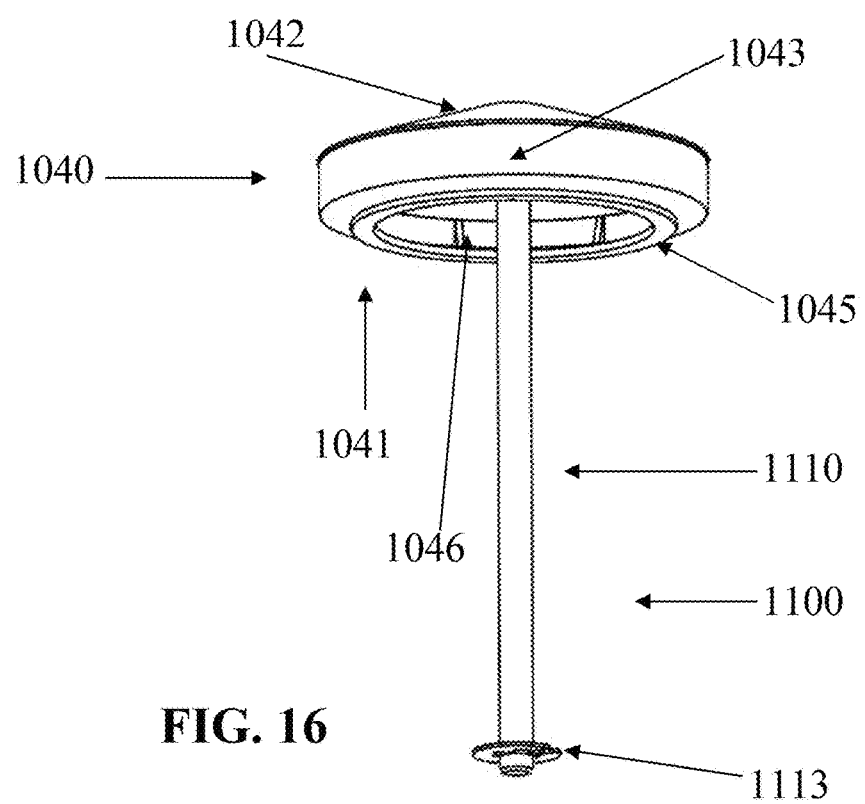
FIG. 16 is a perspective view of a floating damper according to the embodiment of the present invention illustrated in FIG. 10.

Furthermore, as illustrated in FIG. 16, the guide structure 1100 may comprise a guide pin lower stop 1113. In this embodiment, the guide pin 1110 is integrally formed with the floating damper 1040 such as in the apex 1043 of the conically shaped upper surface 1042 of the floating damper 1040 as shown in FIG. 11B. The guide pin 1110 then fits within the tubular member 1039 of the accumulation damper 1030 which in turn would fit within the central opening 1126 of the lower guide web 1120. The guide pin lower stop 1113 may act on the lower guide web 1120 to prevent excess axial displacement of the floating damper 1040, such as may be caused by the exhaust gas of the appliance 6. Furthermore, the guide pin lower stop 1113 may act on the lower end of the tubular member 1039 of the accumulation damper 1030 such that the force of the exhaust gas on the floating damper 1040 may assist in raising the accumulation damper 1030.

Figure 15:
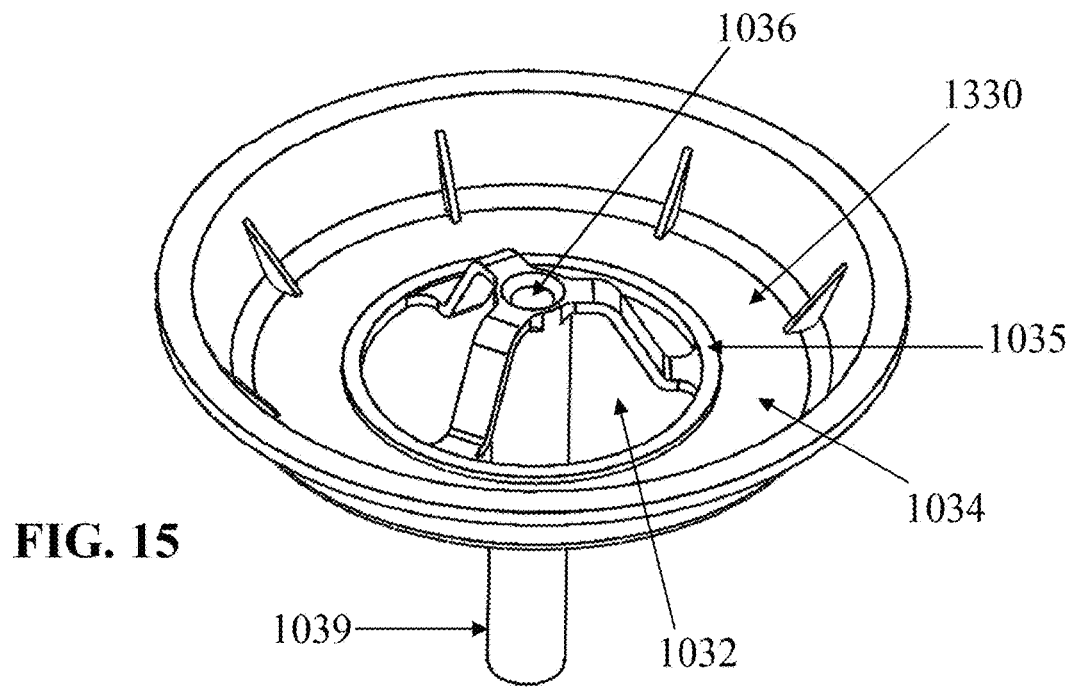
FIG. 15 is a perspective view of the accumulation damper according to the embodiment of the invention illustrated in FIG. 10.

As illustrated in FIGS. 15 and 16, the floating damper seat 1034 preferably comprises an axially extending ridge 1035 which mates with the axially extending radial ridge 1045 of the floating damper 1040 when the appliance 6 is in standstill and the condensate 300 is not present or is below the buoyancy threshold to facilitate sealing the drainage holes 1032. In this position, the conically shaped upper surface 1042 seals the drainage holes 1032 and prevents drainage of the condensate 300 through the drainage holes 1032, as well as, restricting flue gas backflow through the drainage holes 1032.

Figure 12:
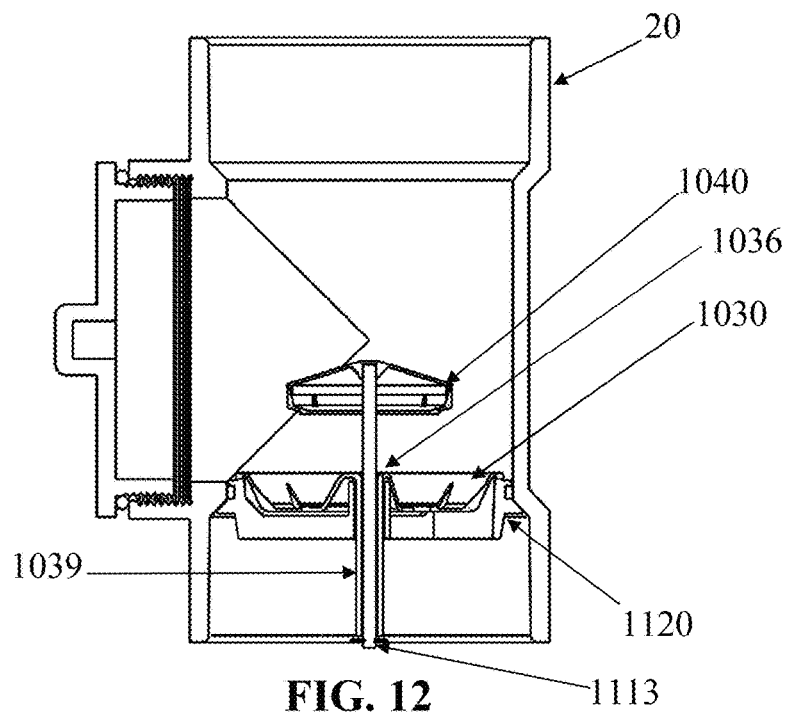
FIG. 12 illustrates a cross-sectional view of the non-return valve shown in FIG. 10 with the appliance at a first operating state according to one embodiment of the present invention.
Figure 13:
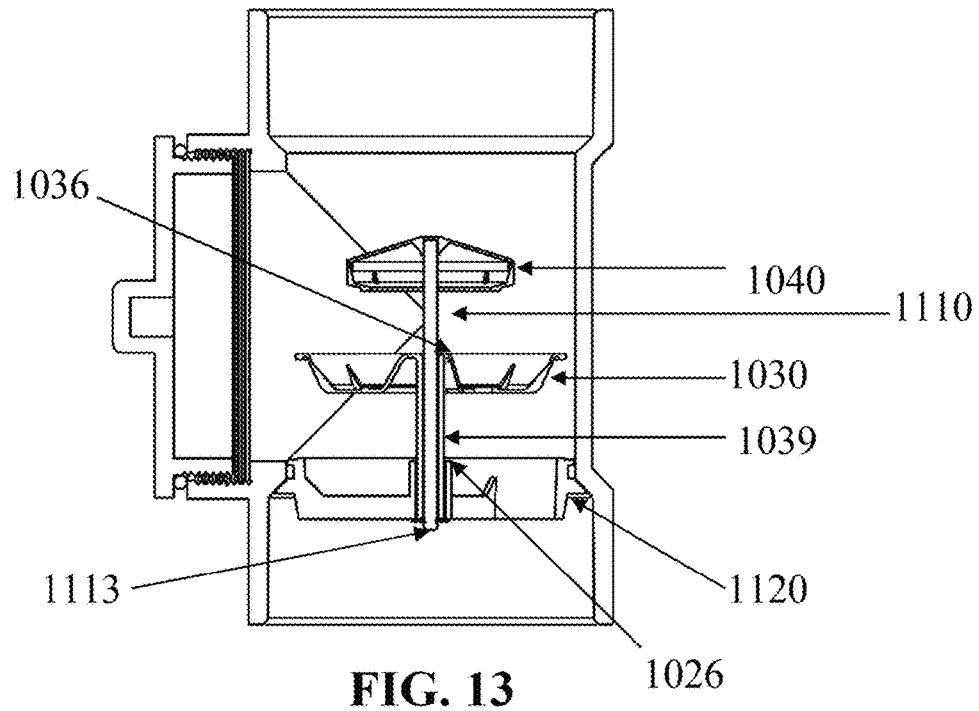
FIG. 13 illustrates a cross-sectional view of the non-return valve shown in FIG. 10 with the appliance at a second operating state, higher than the first operating state, according to one embodiment of the present invention.

FIGS. 12 and 13 illustrate the non-return valve 1010 in different operating states of the appliance 6 according to one preferred embodiment. As illustrated in FIG. 12, when the appliance 6 is operating at a first level having a relatively lower air pressure coming from the lower opening 22, only the floating damper 40 may be raised or moved axially by the guide pin lower stop 1113 acting on the tubular member 1039 in the accumulation damper 1030. As illustrated in FIG. 12, in the first operation, only the floating damper 1040 may be raised or moved axially and the accumulation damper 1030 remains in the accumulation damper seat 1123 formed by the lower guide web 1120. In this case, the first level of operation would be above standstill, but below a higher second level of operation having a higher air pressure coming from the exhaust gas of the appliance 6. In the first level of operation, the relatively low air pressure of the exhaust gas may not be sufficient to lift the accumulation damper 1030, but may pass through the drainage holes 1032 and lift the floating damper 40. At this position, any sludge which may have built up in the accumulation damper 1030 or underneath the floating damper 1040 may be broken up and carried away.

FIG. 13 illustrates the non-return valve 1010 with the appliance 6 operating at a second level of operation, higher than the first level of operation, where the air pressure generated by the exhaust gas of the appliance 6 is higher than the air pressure generated at the first level. In this case, the higher air pressure at the second level of operation coming from the lower opening 22 is sufficient to lift the accumulation damper 1030 and the floating damper 1040 relative to the lower housing 20 in an axial direction along the guide pin 1110. This higher level of operation generated by the appliance 6 further assists in breaking up and carrying away deposits and residue from the surface of the accumulation damper 1030 and the floating damper 1040 to further assist in preventing sludge build-up. As is apparent from FIGS. 12 and 13, the guide pin 1110 passes through the opening 1036 of the tubular member 1039 and, in turn, the tubular member 1036 passes through the central web opening 1126 of the lower web 1020.

Whether the air pressure generated by operation of the appliance 6 may lift the floating damper 1040 only, or both the floating damper 1040 and accumulation damper 1030, it is understood that in either case, once the appliance 6 returns to standstill through gravity, the accumulation damper 1030 would return to the accumulation damper seat 1123 and the floating damper 1040 would return to the floating damper seat 1034 as shown in FIG. 11C.

As illustrated in FIG. 15, the accumulation damper 1030 has at least one and preferably several drainage holes 1032 for draining the condensate 300 that accumulates in the accumulation damper 1030. The conically shaped upper surface 1042 of the floating damper 1040 is preferably radially aligned with the drainage holes 1032 and will occlude or cover the openings 1032 as illustrated in FIGS. 11A, 11B and FIG. 11C when the appliance 6 is in standstill. In this way, when the floating damper 1040 rest against the floating damper seat 1034, the floating damper 1040 will seal the drainage holes 1032, blocking the flue gas backflow, as shown in FIG. 11C. This would create a dry seal in cases where there is no condensate 300. When sufficient condensate 300 is present to buoy the floating damper, the accumulated condensate 300 itself acts to restrict flue gas backflow. Therefore, the non-return valve 1010 would operate with a dry seal or a wet seal, and therefore does not require prefilling of the accumulation damper 1030 with condensate 300 or other types of fluid to initially operate. In either case, the conically shaped upper surface 1042 may act to increase the downward pressure of the flue gas backflow due to the downward flue gas acting on the substantially conical shaped upper surface 1042.

The floating damper 1040 also preferably comprises a cavity 1046 as shown in FIG. 16. The cavity 1046 facilitates lifting of the floating damper 1040 by the exhaust gas of the appliance 6. Furthermore, the cavity 1046 of the floating damper 1040 may assist in decreasing the weight of the floating damper 1040 so that the condensate 300 will buoy the floating damper 1040 when sufficient condensate 300 has been accumulated in the accumulation damper 1030 to break the seal and permit the condensate 300 to drain through the drainage holes 1032 of the accumulation damper 1030. Thus, the floating damper 1040 and accumulation damper 1030 form a dry seal when no, or insufficient condensate 300, has accumulated in the accumulation damper 1030 (FIG. 11C), and, the dampers 1040, 1030 form a wet seal during buoyant state when sufficient condensate 300 has accumulated to buoy the floating damper 1040 and breaking the seal to permit the condensate 300 to drain through the drainage holes 1032 (FIG. 11B). Therefore, even in this case, the condensate 300 fills the temporary opening between the floating damper 1040 and the accumulation damper 1030, creating a wet seal restricting flue gas backflow into the appliance 6.

To the extent that a patentee may act as its own lexicographer under applicable law, it is hereby further directed that all words appearing in the claims section, except for the above defined words, shall take on their ordinary, plain and accustomed meanings (as generally evidenced, inter alia, by dictionaries and/or technical lexicons), and shall not be considered to be specially defined in this specification. Notwithstanding this limitation on the inference of "special definitions," the specification may be used to evidence the appropriate, ordinary, plain and accustomed meanings (as generally evidenced, inter alia, by dictionaries and/or technical lexicons), in the situation where a word or term used in the claims has more than one pre-established meaning and the specification is helpful in choosing between the alternatives.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments, which are functional, electrical or mechanical equivalents of the specific embodiments and features that have been described and illustrated herein.

The embodiments of the invention in which an exclusive property or privilege is claimed are defined as follows:

1. A non-return valve for use in a chimney of an appliance, said valve comprising:
   a housing having a lower opening in fluid communication with an upper opening;
   an accumulation damper for accumulating condensate in a condensate accumulating area formed in part by a slanted surface and a central area, and, comprising drainage holes for draining the condensate, said condensate accumulation area located near the drainage holes;
   an accumulation damper seat near the lower opening of the housing for receiving the accumulation damper and extending substantially across the lower opening; and
   a floating damper formed of a material having a lower density than water for resting against the accumulation damper and sealing the drainage holes when a volume of condensate accumulated in the condensate accumulation area of the accumulation damper is below a threshold, and, wherein when the volume of condensate accumulated in the condensate accumulation area of the accumulation damper is above the threshold, the floating damper is buoyed by the condensate breaking the seal with the drainage holes to permit drainage of the condensate through the drainage holes.

2. The non-return valve as defined in claim 1 wherein, when the appliance is in standstill, the accumulation damper rests on the accumulation damper seat substantially across the lower opening, and the floating damper rests against the accumulation damper to seal the drainage holes blocking flue gas backflow.

3. The non-return valve as defined in claim 1 wherein, when the appliance is operational at a first level, air pressure generated by the exhaust gas of the appliance lifts the floating damper to permit exhaust gases from the operation of the application at the first level to pass through the drainage holes of the accumulation damper to the chimney.

4. The non-return valve as defined in claim 3 wherein, when the application is operational at a second level higher than the first level, air pressure generated by the exhaust gas of the appliance lifts the floating damper and the accumulation damper to permit exhaust gases from the operation of the appliance at the second level to pass through the lower opening of the housing.

5. The non-return valve as defined in claim 1 wherein air pressure generated by operation of the appliance lifts the floating damper or both the floating damper and the accumulation damper to permit exhaust of exhaust gases from the appliance.

6. The non-return valve as defined in claim 1 further comprising a guide structure permitting the floating damper and the accumulation damper to move relative to the housing.

7. The non-return valve as defined in claim 6 wherein the guide structure comprises a guide pin concentrically orienting the floating damper and the accumulation damper within the housing.

8. The non-return valve as defined in claim 7 wherein the guide structure further comprises a lower guide web located at the lower opening of the housing;
   wherein the lower guide web orients the guide pin within the housing to guide movement of the floating damper and the accumulation damper relative to the housing; and
   wherein the lower guide web comprises the accumulation damper seat for receiving the accumulation damper when the appliance is in stand still.

9. The non-return valve as defined in claim 8 wherein the housing is oriented with respect to gravity such that the upper opening is above the lower opening;
   wherein, when the appliance stops operation and returns to standstill, the accumulation damper returns to the accumulation damper seat and the floating damper rests on the accumulation damper through gravity to seal the drainage holes.

10. The non-return valve as defined in claim 1 wherein the floating damper has a density of between 0.80 and 0.95 grams per cubic centimeter.

11. A damper assembly for use in a chimney of an appliance having a combustion device, said damper assembly comprising:
   an accumulation damper for accumulating condensate from the chimney, said accumulation damper having drainage holes for draining the condensate and a condensate accumulation area formed in part by a slanted surface and a central area, said accumulation area located near the drainage holes;
   a floating damper formed of a material having a density lower than the density of water;
   a floating damper seat on the accumulation damper for receiving the floating damper and providing a seal with the drainage holes; and
   wherein the floating damper rests on the floating damper seat of the accumulation damper when insufficient condensate has been accumulated in the condensate accumulation area of the accumulation damper to buoy the floating damper, and when sufficient condensate has been accumulated in the condensate accumulation area of the accumulation damper to buoy the floating damper, the floating damper floats above the accumulation damper breaking the seal and permitting condensate to drain through the drainage holes.

12. The damper assembly as defined in claim 11 wherein the floating damper has a density of between 0.80 and 0.95 grams per cubic centimeter.

13. The damper assembly as defined in claim 11 further comprising a guide structure permitting the floating damper and the accumulation damper to move relative to one another.

14. The damper assembly as defined in claim 13 wherein the guide structure comprises:
   a guide pin concentrically orienting the floating damper with respect to the accumulation damper;
   a lower guide for connection to a lower opening of the housing;
   wherein the lower guide web orients the guide pin within the housing to guide movement of the floating damper and the accumulation damper relative to the housing; and
   wherein the lower guide web comprises the accumulation damper seat for receiving the accumulation damper when the appliance is in stand still.

15. The damper assembly as defined in claim 14 wherein, when the appliance stops operation and returns to standstill, the accumulation damper returns to the accumulation damper seat and the floating damper returns to the floating damper seat on the accumulation damper through gravity to seal the drainage holes.

16. The damper assembly as defined in claim 11 further comprising a tapered seal formed between the accumulation damper and the floating damper when the appliance is in standstill to prevent flue gas from entering the appliance.

17. The damper assembly as defined in claim 11 further comprising an axially extending radial groove associated with the accumulation damper cooperating with a corresponding axially extending radial ridge associated with the floating damper;
   wherein the axially extending radial ridge engages the axially extending radial groove when the floating damper is received in the floating damper seat of the accumulation damper to seal the drainage holes.

18. The damper assembly as defined in claim 17 wherein the axially extending radial ridge has tapered axially extending radial ridge surfaces which mate with corresponding tapered axially extending radial groove surfaces to create a tapered seal between the floating damper and the accumulation damper.

19. The non-return valve as defined in claim 1 further comprising an axially extending radial groove associated with the accumulation damper and cooperating with a corresponding axially extending radial ridge associated with the floating damper;
   wherein the axially extending radial ridge engages the axially extending radial groove when the floating damper is received in the floating damper seat of the accumulation damper to seal the drainage holes.

20. The non-return valve as defined in claim 19 wherein the axially extending radial ridge has tapered axially extending radial ridge surfaces which mate with corresponding tapered axially extending radial groove surfaces of the axially extending radial groove to form a tapered seal between the floating damper and the accumulation damper.

21. The non-return valve as defined in claim 2, wherein a tapered seal is formed between the accumulation damper and the floating damper.

22. The non-return valve as defined in claim 2, wherein the floating damper has a substantially conically shaped upper surface radially aligned with the drainage holes; and
- wherein, when the appliance is in standstill, and the condensate is below the threshold, the conically shaped floating damper rests against the accumulation damper seat to seal the drainage holes and restrict flue gas backflow, and,
- wherein, when the appliance is in standstill and the floating damper is buoyed by the condensate breaking the seal with the drainage holes to permit drainage of the condensate through the drainage holes, the condensate restricts flue gas backflow.

23. The non-return valve as defined in claim 1 wherein the accumulation damper has a substantially bowl-like shape to permit accumulation of the condensate in the accumulation area.

24. The damper assembly as defined in claim 11 wherein the accumulation damper has a substantially bowl-like shape to permit accumulation of the condensate in the accumulation area.

* * * * *